No. 786,553. PATENTED APR. 4, 1905.
L. DURAND.
DOUGH KNEADING MACHINE.
APPLICATION FILED JUNE 30, 1904.
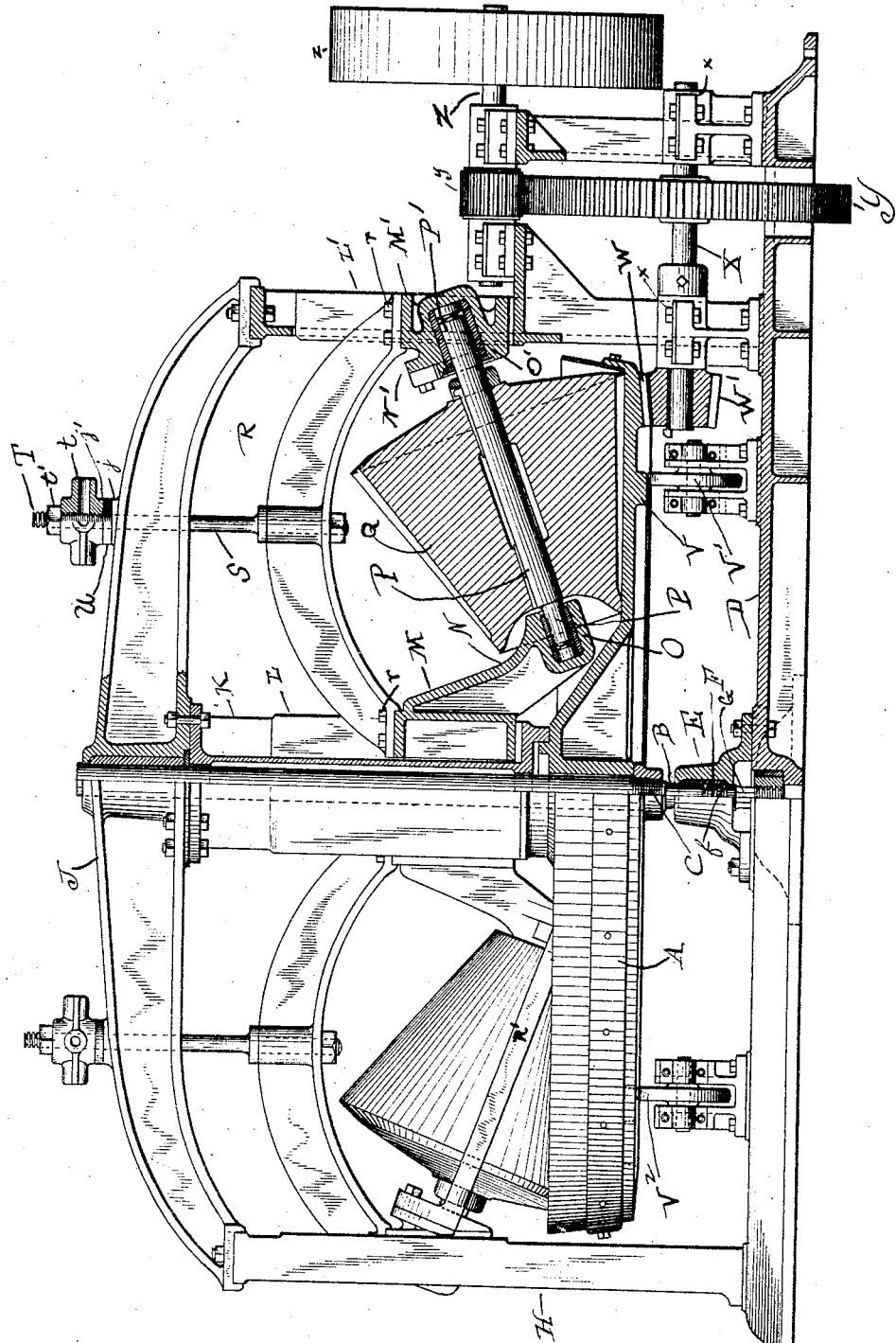

No. 786,553.

Patented April 4, 1905.

UNITED STATES PATENT OFFICE.

LOUIS DURAND, OF NEW YORK, N. Y.

DOUGH-KNEADING MACHINE.

SPECIFICATION forming part of Letters Patent No. 786,553, dated April 4, 1905.

Application filed June 30, 1904. Serial No. 214,736.

*To all whom it may concern:*

Be it known that I, LOUIS DURAND, a citizen of the United States, residing in the borough of Manhattan, city of New York, county and State of New York, have invented new and useful Improvements in Dough-Kneading Machines, of which the following is a specification.

My invention is more particularly adapted to dough-kneading machines of a large size; but I do not limit myself to such a structure, as it may be applied to a machine for domestic use; but, as above stated, it is more particularly adapted to larger machines.

I will proceed to describe my invention in connection with the accompanying drawing, which forms a part of this specification and shows my dough-kneader partly in side elevation and partly in section.

In the drawing, A represents a dough-kneading pan—that is to say, a pan in which the dough is deposited for the purpose of undergoing the kneading operation. This pan A is circular in shape and is provided with a centrally-located supporting-pin B, which extends downwardly therethrough and is secured to the pan by a screw-joint C.

At D, I show a base-plate or table having a step E, the latter provided with a central opening F, into which the pin B of the pan extends. To facilitate the easy turning and operation of the pin in the step, I provide two or more metallic buttons *f*, which I locate between the lower terminal of the pin B and the head of the bolt G, the latter being centrally locked in the step. This particular structure I have found adapted for the functions required of it, and I have employed it in the present instance.

At H, I show standards extending upwardly from the table or base-plate D, which standards support the arms J. These arms extend radially outward from the center of the machine and are supported by the standards H at their outer ends and are attached to the housing K at their inner ends. The housing K is provided for the pin B. Upon this housing are placed keepers L, and corresponding keepers L' are placed upon the standards H. Operating in these keepers L L' are the vertically-sliding journal-frames M M'. These keepers are closed at the sides and back, and they prevent all lateral movement upon the part of the vertically-moving journal-frames. The frame M has a downwardly-extending part N and is provided with a journal-box O, and the frame M' has an overhanging part N'. The journal-box on this frame is shown at O'. In these journal-boxes O and O' are located the journals P' of the shaft or spindle P of the rotating dough-kneader Q. This rotating dough-kneader is conical-shaped, the smaller end or cross-section being toward the center of the pan and the larger cross-section being in proximity to its outer edge.

It will be seen by reference to the drawing that the shaft or spindle P of the rotating dough-kneader slants downwardly from the outer edge of the pan A toward the center and is a median line between the converging upper and lower edges of the dough-kneading roller.

By reason of the above-described construction and the relation of the parts, the dough kneading-roller being of conical shape, as aforesaid, the shaft or spindle P will, as aforesaid, slant downwardly from the outer edge of the machine toward the center.

The journal-frames M and M' are connected by the arch-shaped bridge R, which is attached to said frames M M' by bolts *r*. I provide also the braces R', which extend one on each side of the roller Q and which are each and both attached to the journal-frames M M'. The roller-frames consist, therefore, of the journal-frames M M', the braces R', and the bridge R. Centrally located upon the bridge R and extending upwardly therethrough are rods S. These rods extend upwardly, also, through the arms J and terminate at their upper ends in screw portions T. The arms J are provided with seats *j*, and the rods S have nuts *t* secured onto the upper ends of the rods, which nuts have seats *j'* at their lower edges. Between the upper and the lower seat, as above described, are rubber cushions U, so that as the dough-kneading roller rolls over and into the dough-kneading pan the rubber cushion will take up the variation in vertical movement in the dough-kneading roller. The roller is thus retained by means of this supporting and cushioning device somewhat above the surface of the pan. A lock-nut $t'$ is provided to securely maintain the parts in any predetermined adjustment.

At V, I show a track upon the bottom of the dough-kneading pan, and at V' and $V^2$, I show antifriction supporting-rollers, one of said rollers being nearer the center of the machine than the other, so that it will travel upon and wear upon different portions of the track.

At W, I show a rack formed integrally with the pan A and provide it with teeth, intermeshing with the bevel-gearing W', the latter being mounted upon a shaft X. Shaft X is supported by and is journaled in a frame $x$ and is provided with gear-wheel Y, intermeshing with gear-wheel $y$, the latter being mounted upon a shaft Z, receiving power from the band-wheel $z$ or from any other suitable source.

Heretofore in dough-kneading machines it has been the practice in some cases to provide a pressure upon the lower side of the dough-kneading pan, pressing upwardly in order to insure the proper manipulation of the dough by the kneaders and stirrers; but in my present invention I provide for that pressure by a gravity dough-kneading roller, as the roller Q bears upon the material, being operated by reason of its own weight.

It is understood that ordinarily and when the machine is in operation the roller is supported by the dough upon which it is operating, as the supporting and cushioning device above described permits of the constant and automatic upward adjustment of the roller-supporting frames; but it is also to be understood that the downward adjustment of the same when not limited by the material operated upon is checked by the cushioning device aforesaid.

Having thus described my invention, the following is what I claim as new therein and desire to secure by Letters Patent:

1. In a dough-kneading machine, the combination of a dough-kneading pan, a gravity-roller therein, and a roller-supporting frame consisting of journal-frames, braces on each side of said roller extending between and connecting the journal-frames, and the bridge extending between the upper parts of the journal-frames, all constructed substantially as and for the purposes set forth.

2. In a dough-kneading machine, the combination of a dough-kneading pan, a roller, a roller-supporting frame constructed substantially as shown and described, and a centrally-located supporting and cushioning device secured to the roller-frame.

3. In a dough-kneading machine, the combination of a dough-kneading pan, a gravity-roller operating therein and having a shaft or spindle slanting downwardly from the outer edge of the machine toward the center, frames for the journals of said shaft or spindle, and keepers arranged substantially as shown and described, and operating as guides for the vertical travel of the journal-frames.

4. In a dough-kneading machine, the combination of a dough-kneading pan, a gravity-roller operating therein, a vertically-adjustable roller-supporting frame consisting of the journal-frames and side braces and a bridge, and means centrally located for locking the roller-supporting frame in any predetermined vertical position.

5. In a dough-kneading machine, the combination of the base-plate, the standards rising therefrom, the centrally-located housing, the arms extending from the housing to the standards, the dough-kneading pan and a gravity-roller, and the roller-supporting frame adapted to slide in one of the standards and housing whereby it is guided, all constructed to operate substantially as and for the purposes set forth.

LOUIS DURAND.

Witnesses:
HERBERT KNIGHT,
K. ELLIS.